(12) United States Patent
Berg et al.

(10) Patent No.: US 10,858,201 B2
(45) Date of Patent: Dec. 8, 2020

(54) VACUUM CONVEYOR SYSTEM

(71) Applicant: Piab Aktiebolag, Täby (SE)

(72) Inventors: Mattias Berg, Stockholm (SE); Gustav Mölle, Täby (SE); Anders Nilsén, Stockholm (SE); Jonas Köhler, Stockholm (SE)

(73) Assignee: Paib Aktiebolag, Täby (SE)

( * ) Notice: Subject to any disclaimer, the term of this patent is extended or adjusted under 35 U.S.C. 154(b) by 0 days.

(21) Appl. No.: 16/253,859

(22) Filed: Jan. 22, 2019

(65) Prior Publication Data

US 2019/0263602 A1    Aug. 29, 2019

(30) Foreign Application Priority Data

Feb. 27, 2018 (EP) .................................... 18158793

(51) Int. Cl.
*B65G 53/66* (2006.01)
*B65G 51/16* (2006.01)
(Continued)

(52) U.S. Cl.
CPC ............. *B65G 51/16* (2013.01); *B65G 51/18* (2013.01); *B65G 51/30* (2013.01); *B65G 53/24* (2013.01);
(Continued)

(58) Field of Classification Search
CPC ........ B65G 53/24; B65G 53/26; B65G 53/60; B65G 53/66
(Continued)

(56) References Cited

U.S. PATENT DOCUMENTS 3,694,037 A * 9/1972 Feder .................... B65G 53/06
406/23
3,989,308 A * 11/1976 Zimmermann ........ B65G 53/24
406/23
(Continued)

FOREIGN PATENT DOCUMENTS

CN          1361744 A      7/2002
CN          104176506      12/2014
(Continued)

OTHER PUBLICATIONS

European Search Report for corresponding European Patent Application No. 18158793.2 dated Jul. 9, 2018.
(Continued)

*Primary Examiner* — Joseph A Dillon, Jr.
(74) *Attorney, Agent, or Firm* — Renner, Otto, Boisselle & Sklar, LLP

(57) ABSTRACT

A conveyor system (10) for transporting a transportable material (M) by means of a fluid for transporting the transportable material (M) between a first conveying line portion (11) and a second conveying line portion (12), said conveying line portions (11, 12) comprising a plurality of pipes forming a continuous conveying line (13), said system (10) comprising: a conveyor device (1) in fluid connection to one of said first or said conveying line portions (11, 12) operative to provide negative air pressure or vacuum through said conveying line (13);
a material feeder device (2); wherein the conveyor device (1) comprises at least one material level sensor (1a, 1b), wherein the at least one material level sensor (1a, 1b) is used to monitor one or more material level(s) inside the conveyor device (1) and via one or more material level sensor lines (3) giving at least one material level signal (1aa, 1bb) to a controller (4) and from the controller (4) via a control signal line (5) transmit a control signal
(Continued)

(5a) to the material feeder device (2) having a valve (6) adapted to control the amount of air injected into the system, typically the into the conveying line (13), wherein the controller (4) is adapted to control the valve (6) and/or a mass-flow (M), respectively, of the material feeder device (2) in dependence of output from the at least one material level sensor (1a, 1b) to control amount of air injected into the conveying line (13) at the feeder device (2).

6 Claims, 2 Drawing Sheets

(51) Int. Cl.
  *B65G 51/18* (2006.01)
  *B65G 51/30* (2006.01)
  *B65G 53/24* (2006.01)
(52) U.S. Cl.
  CPC ........ *B65G 53/66* (2013.01); *B65G 2201/042* (2013.01); *B65G 2814/0229* (2013.01)
(58) Field of Classification Search
  USPC ..... 406/12, 21, 23, 151, 152, 153, 168, 173, 406/24, 25; 222/56, 64
  See application file for complete search history.

(56) References Cited

U.S. PATENT DOCUMENTS

| | | | | | |
|---|---|---|---|---|---|
| 4,486,100 | A * | 12/1984 | Endo | ...................... | B29C 48/92 366/76.93 |
| 4,862,649 | A * | 9/1989 | Davis | ................... | B24C 7/0053 451/38 |
| 6,325,572 | B1 * | 12/2001 | Dietrich | ................. | B65G 53/14 406/146 |
| 6,379,086 | B1 * | 4/2002 | Goth | ...................... | B65G 47/19 406/75 |
| 6,413,020 | B1 * | 7/2002 | Davison | ................. | B65G 53/24 406/145 |
| 6,588,988 | B2 * | 7/2003 | Zlotos | ................... | B65G 53/24 406/14 |
| 6,890,129 | B2 * | 5/2005 | Fabbri | ................... | B01D 29/01 406/106 |
| 7,896,584 | B2 * | 3/2011 | Sundholm | .............. | B01D 47/06 406/48 |
| 8,113,745 | B2 * | 2/2012 | Aoki | .................... | B65G 53/525 406/126 |
| 8,360,691 | B2 * | 1/2013 | Moretto | ................. | B65G 53/66 406/17 |
| 8,491,228 | B2 * | 7/2013 | Snowdon | .............. | B01J 8/0025 406/14 |
| 8,905,681 | B2 * | 12/2014 | Schneider | ............. | B65G 53/06 209/139.1 |
| 9,611,106 | B2 * | 4/2017 | Tell | ........................ | B65G 53/24 |
| 9,708,138 | B2 * | 7/2017 | Veselov | ................. | B65G 53/24 |
| 9,758,319 | B2 * | 9/2017 | Celella | ................... | B65G 53/26 |
| 2005/0183574 | A1 * | 8/2005 | Burnett | .................. | B65G 53/10 95/271 |
| 2015/0375935 | A1 * | 12/2015 | Sundholm | .............. | B65F 5/005 406/151 |
| 2016/0096693 | A1 | 4/2016 | Hanaoka et al. | | |
| 2016/0272438 | A1 * | 9/2016 | Brewster | ............... | B65G 53/66 |
| 2016/0280473 | A1 * | 9/2016 | Veselov | ................. | B65G 53/24 |
| 2016/0347557 | A1 * | 12/2016 | Tell | ........................ | B65G 53/66 |
| 2017/0210574 | A1 * | 7/2017 | Ellis | ...................... | B65G 53/66 |
| 2018/0340877 | A1 * | 11/2018 | Thuman | ............. | G01N 15/0826 |
| 2019/0263601 | A1 * | 8/2019 | Berg | ..................... | B65G 51/02 |

FOREIGN PATENT DOCUMENTS

| | | |
|---|---|---|
| CN | 106185329 | 12/2016 |
| EP | 1 214 260 A1 | 6/2002 |
| EP | 2 045 199 A1 | 4/2009 |
| RU | 2 058 256 C1 | 4/1996 |

OTHER PUBLICATIONS

Oskar Nydahl: "Auto tuning of a vacuum conveyor", Jan. 25, 2016 (Jan. 25, 2016), XP055502219, Retrieved from the Internet: URL:http://www.diva-portal.se/smash/get/diva2:897392/FULL_TEXT01.pdf [retrieved on Aug. 24, 2018].

Anonymous: "PIAB Vacuum Academy," Feb. 12, 2018 (Feb. 12, 2018), XP055502207, Retrieved from the Internet: URL:http://www.vakuumtechnik.cz/download/p_iab/vakuove_dopravniky_GB.pdf [retrieved on Aug. 24, 2018], p. 21.

First Office Action for corresponding Chinese Patent Application No. 2019-101420690, dated Jul. 16, 2020 and Translation.

* cited by examiner

VACUUM CONVEYOR SYSTEM

This application claims priority to European Patent Application No. 18158793.2 filed on Feb. 27, 2018, which is hereby incorporated herein by reference.

FIELD

The present disclosure relates generally to vacuum conveyor systems.

BACKGROUND

Vacuum conveyor systems, sometimes also referred to as vacuum conveyors, are well-known for the transport of transportable material between, for example, a first origin location and a second destination location in a plurality of interconnected pipes by means of a fluid under negative pressure such as vacuum. A typical vacuum conveyor system includes a number of pipes interconnected to a continuous conveying line such as a pipe-line to transport pneumatically transportable material therein. Various conveyor devices, at the first location, the origin and/or the second location, the destination, provide a force affecting a conveying fluid, such as air, flowing in the pipe-line for transport of the transportable material within the pipeline. Thus, the vacuum conveyor system transports material by means of a transporting fluid under negative pressure or vacuum in a continuous conveying line. Often vacuum is used in these vacuum conveyor systems and they are therefore sometimes simply referred to as "vacuum conveying technology".

The pipes forming the pipe-line, i. e. the conveying line of the conveyor system for instance using vacuum conveying technology may be arranged in any manner that allows the material to be transported between various locations including straight pipes but also bent pipes. It will be appreciated that the distances between origin and destination locations in the conveying line may be quite large and that a material transport speed may be quite high within the conveying line.

The vacuum conveyor systems are also typically required to handle a large variety of products from bridging to free flowing powder.

A first problem with vacuum conveyor systems is that tuning a vacuum conveyor system to ensure capacity and reliability is a complicated process which requires a skilled operator. Different settings in the system affect each other and make it difficult and time consuming to optimize the transportation. Giving that a vacuum conveyor system also is sensible to changes in the surrounding environment makes it even more difficult to obtain an even production capacity.

A second problem with vacuum conveyor systems is that a pipe emptying function is often used in vacuum conveyor systems that have large lifting heights. The pipe emptying unit is usually placed just before the lift and is activated at the end of each cycle to empty the pipeline. Normally a charge time is set and the pipe emptying valve is activated during a defined time at the end of the charge time.

SUMMARY

Until now, none of the above problems related to vacuum conveyor systems have even been addressed properly according to our knowledge and the problems will therefore be further discussed as follows below.

To further complicate this problem, a vacuum conveying line could be used to convey many different materials such as powders at the same production line. To manual adjust setting between different material increase downtime in production.

A problem when using a vacuum conveyor system is to tune all equipment in the system to obtain a desired capacity without risk of blockage in the pipeline. This requires a skilled operator knowing how the different setting affects each other. The main setting to be made to obtain a material transport in the conveying line with high capacity and reliability is the mixture of air/material in the conveying line.

First Problem and First Aspect:

Two other critical settings for the vacuum conveyor system are:

Time to charge material into the vacuum conveying line

Time to discharge material from the vacuum conveying line (or other part of the conveyor system)

The time to charge material into the vacuum conveyor device depends how well the mixture of the air/material is. By adjusting air/material mixture, the charge time needs to change. Even with fixed setting for mixture of air/material the time will vary and sometimes under-fill and sometimes over-fill a conveyor device.

Under-filling the vacuum conveyor device gives a lower overall capacity. Over-filling the conveyor device could damage the filter or create a material blockage inside the conveying line, making discharge impossible.

Discharge time of material is not as critical as above mentioned parameters but by optimizing discharge time, capacity can be increased.

Another problem is that the conveyor system settings are sensitive to surrounding environment factors such as temperature, atmospheric pressure and humidity. These factors affect the conveyed material and could result in that a setting, which works one day might not work the other day. This leads to an unpredictable production.

The present invention according to the first aspect will eliminate manual tuning of these settings to both ensure a stable production and to reduce down-time between material change.

Second Problem and Second Aspect:

When tuning a vacuum conveyor system, there is always need to balance between high reliability and capacity. When trying to achieve a high capacity you sometime need to convey in a dense phase, meaning more material in the conveying line. Depending on the material, conveying line length and routing of conveying line this could lead to a material blockage in the conveying line.

Even if a good setting is found, factors in the surrounding environment such as temperature, atmospheric pressure and humidity could very well affect and change the conveying conditions so that a blockage occurs.

Once blockage occurs, it is a time-consuming activity to clear out the conveying line leading to production loss and low overall capacity.

A problem occurs when combining a pipe-emptying function with a level detector which indicates when the conveyor is full. Then it is too late for activating the since the charge time is different between cycle it is hard to predict when to activate a pipe emptying unit providing the pipe-emptying function.

A problem occurs when combining this function with a level detector which indicates when the conveying line is full. Then it is too late for activating. Since the charge time is different between cycles it is also hard to predict when to activate the pipe emptying unit.

The present invention, according to both aspects removes the most critical manual settings by using a non-manual controlling, typically implemented by means of using a controller arranged to control the vacuum conveyor system and using a soft-ware based tuning of the vacuum conveyor system. The mixture air/material is controlled by an air-inlet at a material feeding point.

Typically, according to both aspects, a controller is adapted to control the air-inlet and/or a mass-flow source respectively, of the material in dependence of input from an upper material level sensor and a lower material level sensor adapted to monitor the material level inside the conveyor device to provide an upper material level and a lower material level control signal in dependence of material level inside the conveyor device. The control signals are transmitted to the controller and from the controller to the material feeding point, typically at a material feeder device.

By using level detector(s), a high and low level of material inside of the conveyor device could be monitored. Solution According to the First Aspect:

The sensor(s) are used to monitor material level inside the conveyor device giving a material level signal to a software based controller and from the controller based on the giving a control signal to the material feeder device having an air-inlet valve.

By doing this, the charge/discharge time doesn't have to be fixed and could vary depending on changed condition. This ensures that the conveyor always charge until full and discharge until empty. The sensor(s) is/are also used to collect information for finding best possible settings to mix air/material.

To determine the mixture of air/material, valve, typically an air-inlet valve such as a vent is used to control the amount of air injected into the system, typically at the material feeder.

According to an embodiment of the invention, there is provided a conveyor system for transporting a transportable material by means of a fluid for transporting the transportable material between a first conveying line system portion and a second conveying line system portion. The conveying line portions comprise a plurality of pipes forming a continuous conveying line. The conveyor system comprises:

a conveyor device in fluid connection to one of said first or said second pneumatic system portions operative to provide negative air pressure or vacuum through said conveying line;

a material feeder device. The conveyor device comprises at least one material level sensor, wherein the at least one material level sensor is used to monitor one or more material level(s) inside the conveyor device and via one or more material level sensor lines giving at least one material level signal to a controller and from the controller via a control signal line transmit a control signal to the material feeder device having a valve, wherein the controller is adapted to control the vent and/or a mass-flow, respectively, of the material feeder device in dependence of output from the at least one material level sensor to control amount of air injected into the system, typically into the conveying line at the material feeder device.

An embodiment can use the material level sensor(s) to determine how to set a valve position of a material feeder device for optimum filling time.

According to a second aspect, there is provided an algorithm based function which uses information from two material level sensors (high/low level) to estimate when the pipe emptying unit shall be activated.

To be able to use the pipe emptying function the conveyor needs to be equipped with two material level sensors which could be used by the software in the control system to activate a pipe emptying unit.

The pipe-emptying unit is controlled by an algorithm based function which uses information from the two material level sensors (high/low level) to estimate when the pipe emptying function of the pipe emptying unit, in particular a pipe emptying valve shall be activated.

The invention according to the second aspect benefits the user by allowing to use a pipe emptying function in combination with a two material level sensor controlled vacuum conveyor.

BRIEF DESCRIPTION OF THE DRAWINGS

For a more complete understanding of the present disclosure and further advantages thereof, reference is now made to the following detailed description taken in conjunction with the drawings in which.

DETAILED DESCRIPTION

Reference will now be made to the accompanying drawings, which are intended to at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
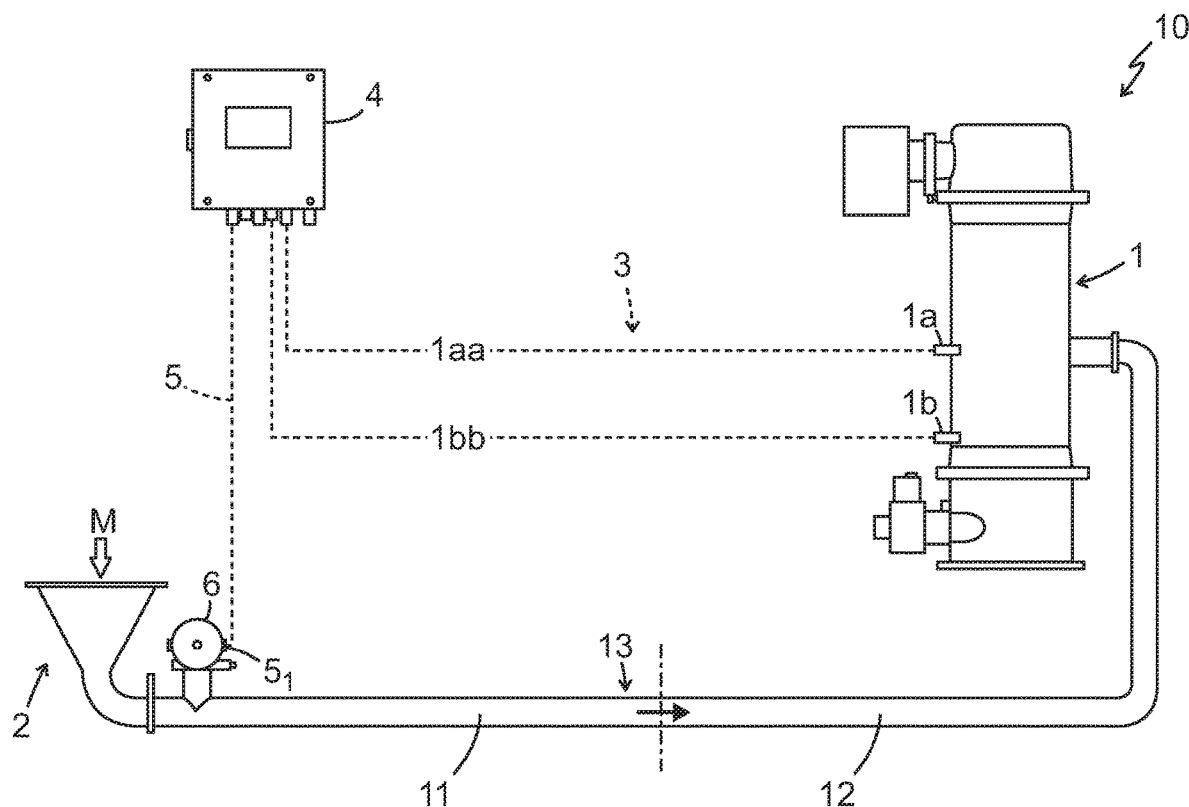
FIG. 1 illustrates vacuum conveyor system comprising a conveyor device having an upper level and a lower material level sensor.

Now is referred to FIG. 1, which illustrates one embodiment of a conveyor system, typically, but not limited thereto, a vacuum conveyor system, 10 according to the invention. The vacuum conveyor system 10 comprises at least one conveyor device 1 for conveying a transportable material M (not shown) in the vacuum conveyor system 10 by means of a fluid, such as compressed air having a negative pressure, herein vacuum, for transporting the transportable material M between (typically from) a first conveying line portion 11 and a second conveying line portion 12 (see dividing line intended to schematically illustrate the conveying line portions 11, 12). The conveying line portions 11, 12 comprise a plurality of interconnected pipes (not shown) forming a conveying line 13 which may as an example be interconnected pipes forming a "pipe-line", being circular in cross-section, but not limited there to. The pipes of the conveying line 13 can be made of stainless-steel for instance, or any other suitable material depending on application, forming the conveying line 13, for transporting the material M. The vacuum conveyor system 10 according to this embodiment comprises one conveyor device 1, connected at the second conveying line portion 12 and a material feeder device 2 connected at the first conveying line portion 11.

The conveyor device 1 provides a force (see direction of flow in the conveying line 13 illustrated by an arrow) affecting a fluid, such as air, flowing in the conveying line 13, typically a pipe-line for transport of the transportable material M within the pipe-line. Thus, the conveying line 13 transports the material M under negative fluid pressure, typically vacuum. Herein, negative pressure, in particular vacuum is provided by the conveyor device 1.

Herein, the term "first portion" includes an origin location and the term "second portion" includes a destination location.

The conveying line portions 11, 12 comprise a plurality of pipes forming a continuous transport path to the conveyor device 1. The conveyor device 1 comprises a fluid source, such as an air source, connected to one of the first or second conveying line portions and operative to provide fluid pressure, such as positive air pressure (referred to as "air pressure") or negative air pressure, or vacuum, through the continuous conveying line 13.

Herein this disclosure, the term "conveyor device" includes at least one of the following: fluid driven ejector-pump, electric vacuum pump, vacuum conveyor device. The conveyor device 1 can be a conventional vacuum conveyor unit, for instance manufactured and sold by the applicant Piab AB, Sweden.

Herein this disclosure, the term "transportable material" any material that can be transported by means of a fluid such as air, including bridging to free flowing powder.

Herein this disclosure, the term "fluid" includes air, nitrogen, but is not limited to these fluids.

Herein this disclosure, the term "fluid source" is, comprised in or connected to: an ejector-pump, electric vacuum pump and feed-hopper but is not limited to these and if the fluid is air, the source is referred to as an "air-source".

According to this specific embodiment, the conveyor device 1 has at least two sensors, an upper material level sensor 1a and a lower material level sensor 1b. The material sensor may be or include a material level detector.

In an alternative embodiment (not shown in FIGS. 1 and 2) only one material level sensor may be sufficient.

The material level sensors 1a, 1b are used to monitor material level inside the conveyor device 2 giving signals 1aa, and 1bb respectively to a software based controller 4. By using material level sensors, a high (herein referred to as "upper") and low (herein referred to as "lower") level of material inside of the conveyor device 1 could be monitored.

By doing this, the charge/discharge time doesn't have to be fixed and could vary depending on changed condition. This ensures that the conveyor device 1 always charge until full up to the upper material level sensor 1a and discharge until empty, down to the lower material level sensor 1b.

The sensor(s) 1a, 1b is/are also used to collect information for finding best possible settings to mix air/material in the feeder device 2 and also in the conveying line 13.

The controller 4 generates control signals 5a that allow for reducing material load of transporting the transportable material by means of controlling the inlet fluid of the conveyor device 2, and/or mass-flow of the material in the conveying line 13. In this way, an essentially a controllable material mass flow can be obtained, also in the conveying line 13. The material level sensors 1a, 1b are used to monitor material level inside the conveyor device 1 arranged to transmit a material level signal 3 from the material level sensors 1a, 1b to the controller 4 and based on the giving a control signal 5 to the material feeder device 2 having a valve 6, typically a vent. The conveyor device 1 comprises two material level sensors 1a, 1b, arranged to provide and transmit two material level signals 1aa, 1bb.

By doing this, the charge/discharge time of the conveyor device 1 doesn't have to be fixed and could vary depending on changed condition. This ensures that the conveyor device 1 always charge until full and discharge until empty. The sensor(s) 1a, 1b is/are also used to collect information for finding best possible settings to mix air/material. The settings are provided by means of the controller 4, typically a software based controller. The material level signal 3 is typically made up of two signals 1aa and 1bb together making up the material level signal 3 that includes at least the same information as 1aa and 1bb or more information.

This has a number of advantages in addition to the ones described above including removing complicated settings in a vacuum conveyor system and ensuring a high and reliable capacity. Since the tuning of the vacuum conveyor system constantly adapts to changes in the environments, it gives the user a more stable production.

Since the present invention according to this embodiment, as well as various other embodiments, no longer requires a manual tuning, this embodiment also reduces time between change of, typically different but may be the same, materials in a production line, since manually adjusting settings between change of materials increases down time in production. This solves the problem conveying line could be used to convey many different materials, in particular powders, at the same production line.

Another advantage is that since the tuning of the system constantly adapts to changes in the environments, it gives the user a more stable production.

To determine the mixture of air/material, the valve 6 is used to control the amount of air injected into the system 10 at the material feeder 2. The valve 6 of the material feeder 2 may be provided by means of a feed-hopper provided with an air-inlet valve. If nitrogen is used, the feed-hopper includes a lid.

To determine the mixture of air/material, the valve 6 is used to control the amount of air injected into the system 10 at the feeding 2. The valve's 6 position could be set from 0% to 100% open. By measuring the charge time for the valve's 6 specific position, the position could be evaluated against one or more other position.

By using level sensors 1a and 1b, respectively, a high (by upper material level sensor 1a) and low (by lower material level sensor 1b) level of material, respectively could be monitored inside of the conveyor device 1. By doing this the charge/discharge time doesn't have to be fixed and could vary depending on changed condition. This ensures that the conveyor device 1 always charge until full 1a and discharge until empty 1b. The sensors 1a, 1b can also be used to collect information, forwarding the information via sensor line 3 to the controller 4, arranged to use the information from the sensors, for finding best possible settings to mix air/material in the material feeder 2.

The invention according to various embodiments is by the controller 4 arranged to, for instance by means of an algorithm and a computing device having a processor, memory and computer program code, executing the (not shown explicitly) algorithm, determine how to set the valve's 6 position for optimum filling time. The controller 4 then provides a soft-ware based, typically algorithm determined, control system.

The controller 4, which may alternatively be combined in a single unit (not shown), respectively, may include a digital processor and memory. The controller 4 may be configured as one or more programmable digital computers. Connectable to the controller 4, may be one or more user interfaces (not shown) through which a system user (not shown) may monitor the operations of the system 10 and/or manually enter one or more commands to control its operation.

The controller 4 described above in relation to FIG. 1 may include one or more electrical and/or electro-mechanical components which provide for the physical movement of a component such as the valve 6 within the system 10.

The material feeding device 2 comprises or is adapted to and can communicate with controllable actuators $5_1$, which is adapted to be adjusted in control of the controller 4 and arranged for diluting a mass-flow of the material M in the conveying line 13, for instance to prevent choking the conveying line 13 with transport material. The controllable actuator $5_1$, can be electronically adjusted for instance being a so-called "proportional actuator" and adapted to control one or more valves 6 in fluid connection with the conveying line 13, the valve 6 may be separate or combined with the actuator $5_1$. The valve 6 may alternatively be controlled directly by vacuum without the actuator $5_1$. The valve 6 is adapted to either vent positive pressure to atmosphere or provide ambient air (if embodied as a vacuum system as shown and explained in relation to this particular embodiment).

This at least one valve 6 allows for venting the pipe 13 to atmosphere to either exhaust pressure or provide ambient air and is adapted to be controlled. By the controllable actuator $5_1$, the vent 6 and controlled by the controller 4 and arranged for diluting, the mass-flow of the material M in the conveying line 13.

An advantage with this embodiment is that it solves the problem with too much material being feed into the vacuum conveyor system via the feed-hopper 2, as regards transport capacity of that particular vacuum conveyor system and material to be transported, such as to avoid over-filling or under-filling the conveyor device 1, or clogging of material M in the conveying line 13.

Figure 2:
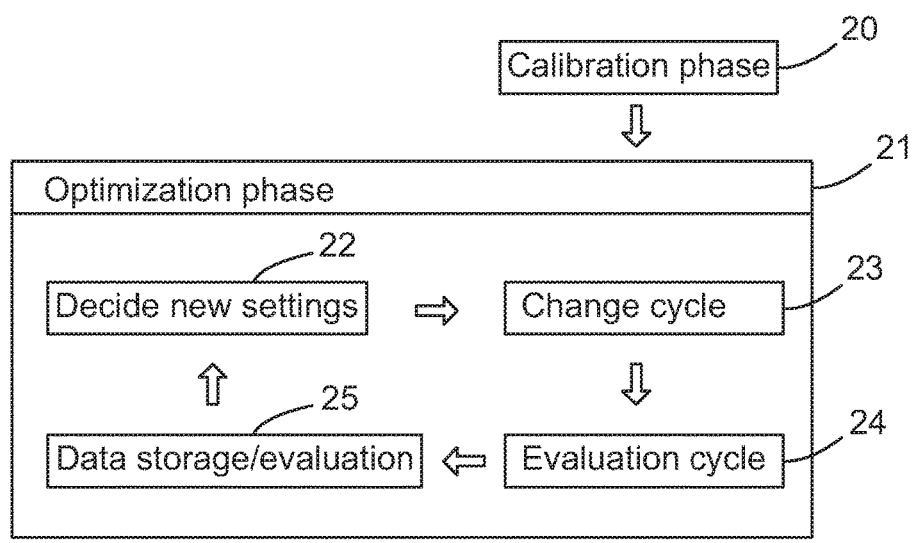
FIG. 2 illustrates a block schematic over a calibration phase and an optimization phase.

Now is referred also to FIG. 2.

The algorithm executed by the controller 4 consists of two main phases:

Calibration phase 20
Optimization phase 21

In the calibration phase, the algorithm determine the system condition and start looking for the valve's 6 position where material starts to enter the system. Once calibration phase 20 is finished the algorithm goes into an optimization 21 phase. The optimization phase 21 in turn consists of a change cycle 23 and an evaluation cycle 24. In the change cycle 23 a new position for the valve 6 is set which is then evaluated in the evaluation cycle 24. Basically, the valve 6 is changing in the same direction (open or close) if the result is getting better. If results are deteriorated the valve will change direction.

The optimization phase 21 has no end state and continuously changes the valve 6 around an optimum position. In this way the system 10 can be adopted to changes in surrounding environment.

Figure 3:
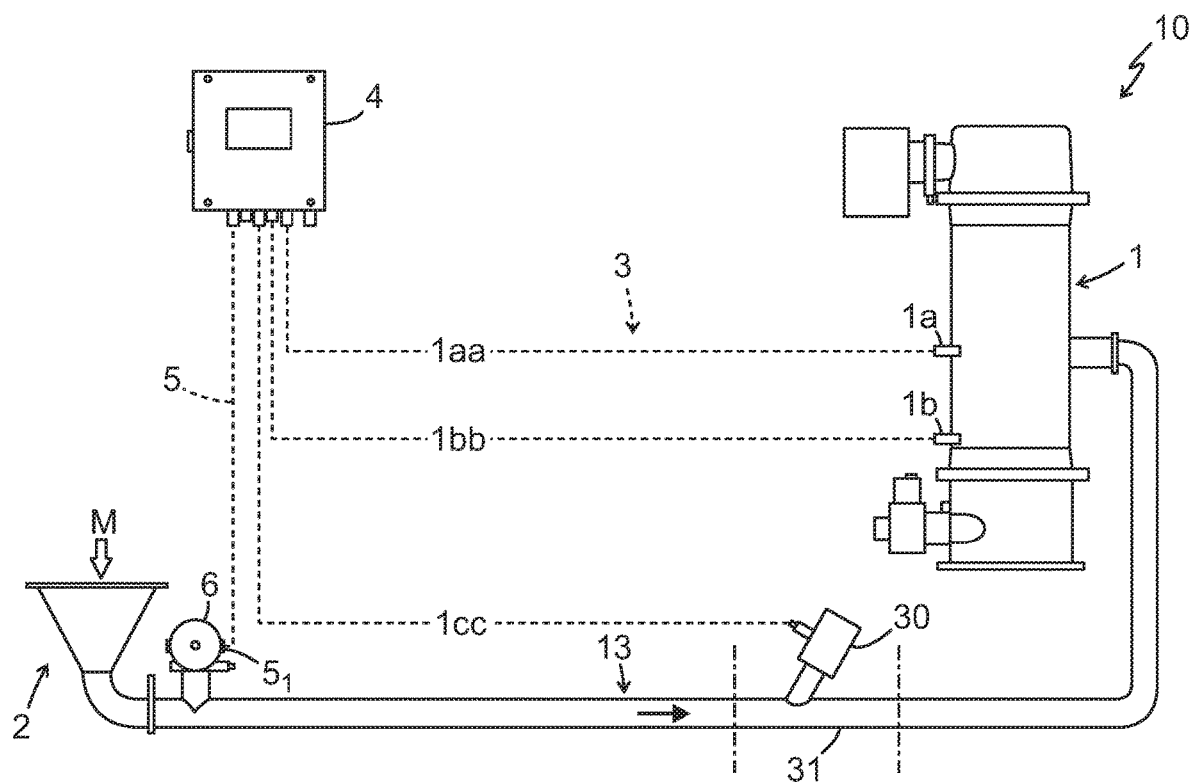
FIG. 3 illustrates a vacuum conveyor system comprising a conveyor device having an upper level and a lower material level sensor and a pipe emptying device.

Pipe Emptying Function:

Now is referred to FIG. 3, which illustrates a vacuum conveyor system 10 comprising a conveyor device 1 having an upper level and a lower material level sensor 1a, 1b and a pipe emptying unit 30 providing a pipe emptying function.

To be able to use the pipe emptying function the conveyor device 1 needs to be equipped with two material level sensors 1a, 1b, which could be used by the software in the controller 4 to activate a pipe emptying unit 30 for instance embodied as a pipe emptying valve.

The pipe emptying function is often used in a conveying system 10 that has large lifting heights. The pipe emptying unit 30 is usually placed just before a lift part 31 (indicated by the line 13 being broken in this lift part and is activated at the end of each cycle to empty the pipeline 13. Normally a charge time is set and the pipe emptying unit 30 is activated by a pipe emptying signal 1cc from the controller 4 to the pipe emptying unit 30 during a defined time at the end of the charge time.

Figure 4:
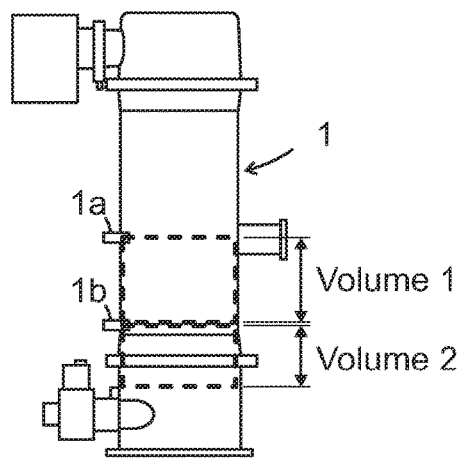
FIG. 4 illustrates a conveyor device having an upper level (volume 1) and a lower material level sensor (volume 2).

Now is referred to FIG. 4

The pipe-emptying function is an algorithm based function which uses information from two material level sensors 1a, 1b (high/low level) of the conveyor device 1 to by means of the controller 4 executing the algorithm 4a estimate when the pipe emptying unit 30, typically embodied as a valve, shall be activated, typically embodied by means of the pipe emptying signal 1cc transmitted from the controller 4 to the pipe emptying unit 30.

When using a fully auto tuned conveyor system 10 in combination with the pipe emptying function, the controller 4 uses the known volume(s) Volume 1 and Volume 2 inside the conveyor device 1 together with the material level sensors 1a, 1b to predict when the pipe emptying unit 30 should be activated and emptying the system 10, in particular the conveying line 13.

The algorithm 4a uses the fact that all internal volume in the conveyor 1 is known, both Volume 2 up to the lower material level sensor 1b and Volume 1 between the lower material level sensor 1b and the upper material level sensor 1a. When the lower sensor 1b is activated the algorithm 4a calculates the time it took to fill volume 2. Using that time, the controller 4 by means of the algorithm can predict how long time that is remaining to fill Volume 1 and activate the pipe emptying unit 30 for a defined time.

If the upper material level sensor 1a is activated during pipe emptying, the algorithm 4a adjusts and activates the pipe emptying unit 30 to open its valve earlier, if not activated it adjust so the pipe emptying unit 30 opens (typically open its valve) later.

This embodiment benefits the user by allowing to use a pipe emptying unit 30 and function in combination conveyor device 1 with two material level sensors 1a and 1b used for control.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain modes known of practicing the inventions and to enable others skilled in the art to utilize the inventions in such or other embodiments and with various modifications required by the particular application(s) or use(s) of the presented inventions.

The invention claimed is:

1. A conveyor system for transporting a transportable material by means of a fluid for transporting the transportable material from a first conveying line portion to a second conveying line portion, said conveying line portions comprising a plurality of pipes forming a continuous conveying line, said system comprising:

a conveyor device in fluid connection to said second conveying line portion operative to provide negative air pressure or vacuum through said conveying line;

a material feeder for having an ambient opening and connected to an inlet end of the first conveying line portion for continuously feeding the transportable material;

wherein the conveyor device comprises an upper material level sensor, wherein the upper material level sensor is used to monitor an upper material level inside the conveyor device and, via a material level sensor line, to give an upper material level signal to a controller, wherein the conveyor device further comprises a lower material level sensor, wherein the lower material level sensor is used to monitor a lower material level inside the conveyor device, and to give a lower material level signal to the controller, and, wherein the controller, via a control signal line, is used to transmit a control signal to a valve adjacent a downstream side of the material feeder and adapted to aspirate air being injected into the system via said valve, through which valve the air enters into the conveying line and is mixed with the transportable material in the conveying line so that a mixture of air and transportable material is obtained in the conveying line, and wherein the valve is controlled by a proportional actuator that is controlled by the control signal, wherein the controller is adapted to generate the control signal based on the upper and lower material level signals to control the amount of air being injected into the conveying line at the material feeder, and thereby the ratio of air to transportable material in the mixture of air and transportable material in the conveying line.

2. The conveyor system according to claim 1, wherein the valve is operative to provide atmospheric air to the material feeder.

3. The conveyor system according to claim 2, wherein the valve is a vent.

4. The conveyor system according to claim 1, wherein the controller is arranged to set the valve's position for optimum filling time.

5. The conveyor system according to claim 1, wherein the conveying line further comprise a pipe emptying unit.

6. The conveyor system according to claim 5, wherein the pipe emptying unit is a valve.

* * * * *